(12) United States Patent
Grant et al.

(10) Patent No.: US 9,715,278 B2
(45) Date of Patent: *Jul. 25, 2017

(54) USER INTERFACE DEVICE PROVIDED WITH SURFACE HAPTIC SENSATIONS

(71) Applicant: IMMERSION CORPORATION, San Jose, CA (US)

(72) Inventors: Danny A. Grant, Laval (CA); Vincent Levesque, Montreal (CA)

(73) Assignee: Immersion Corporation, San Jose, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/719,455

(22) Filed: May 22, 2015

(65) Prior Publication Data

US 2015/0253855 A1  Sep. 10, 2015

Related U.S. Application Data

(63) Continuation of application No. 13/840,876, filed on Mar. 15, 2013, now Pat. No. 9,041,647.

(51) Int. Cl.
| | |
|---|---|
| *G06F 3/01* | (2006.01) |
| *G06F 1/16* | (2006.01) |
| *G06F 3/041* | (2006.01) |
| *G06F 3/0488* | (2013.01) |

(52) U.S. Cl.
CPC ............ *G06F 3/016* (2013.01); *G06F 1/1626* (2013.01); *G06F 1/1694* (2013.01); *G06F 3/017* (2013.01); *G06F 3/0412* (2013.01); *G06F 3/04883* (2013.01)

(58) Field of Classification Search
CPC ............ G06F 3/01; G06F 3/016; G06F 3/041; G06F 1/1626; G08B 6/00
See application file for complete search history.

(56) References Cited

U.S. PATENT DOCUMENTS

| | | | |
|---|---|---|---|
| 8,493,354 B1 | 7/2013 | Birnbaum et al. | |
| 8,659,571 B2 | 2/2014 | Birnbaum et al. | |
| 8,823,674 B2 | 9/2014 | Birnbaum et al. | |
| 9,041,647 B2 * | 5/2015 | Grant et al. | ............. 345/156 |
| 2012/0223880 A1 | 9/2012 | Birnbaum et al. | |
| 2012/0229400 A1 | 9/2012 | Birnbaum et al. | |
| 2012/0327006 A1 | 12/2012 | Israr et al. | |
| 2013/0207904 A1 | 8/2013 | Short et al. | |
| 2013/0300683 A1 | 11/2013 | Birnbaum et al. | |
| 2014/0035736 A1 | 2/2014 | Weddle et al. | |
| 2014/0062682 A1 | 3/2014 | Birnbaum et al. | |
| 2014/0139450 A1 | 5/2014 | Levesque et al. | |
| 2014/0139451 A1 | 5/2014 | Levesque et al. | |
| 2014/0139452 A1 | 5/2014 | Levesque et al. | |
| 2014/0184497 A1 | 7/2014 | Birnbaum et al. | |
| 2014/0198130 A1 | 7/2014 | Lacroix | |
| 2014/0208204 A1 | 7/2014 | Lacroix et al. | |

\* cited by examiner

*Primary Examiner* — Ricardo L Osorio
(74) *Attorney, Agent, or Firm* — Kilpatrick Townsend & Stockton LLP

(57) ABSTRACT

A user interface device includes a housing, a touch sensitive surface supported by the housing, a haptic output device supported by the housing, and a processor disposed within the housing. The processor is configured to receive a gestural input from the touch sensitive surface, generate a signal for a haptic effect to be generated by the haptic output device, and output the signal to the haptic output device to generate the haptic effect.

19 Claims, 3 Drawing Sheets

This application is a continuation application claiming the benefit of priority from U.S. patent application Ser. No. 13/840,876, filed Mar. 15, 2013, the entire content of which is incorporated herein by reference.

USER INTERFACE DEVICE PROVIDED WITH SURFACE HAPTIC SENSATIONS

CROSS-REFERENCE TO RELATED APPLICATIONS

This application is a continuation application claiming the benefit of priority from U.S. patent application Ser. No. 13/840,876, filed Mar. 15, 2013, the entire content of which is incorporated herein by reference.

FIELD

The present invention is related to a user interface device provided with surface haptic sensations.

BACKGROUND

Current user input elements of user interface devices, such as gaming peripherals, typically have a fixed static feel according to their material properties. For example, gaming peripherals, such as gamepads, are used for a wide range of games and are used for control in a wide range of gaming situations. Despite the great variety of situations in which a gamepad is used in a game, the traditional user input elements, such as joysticks, buttons, d-pads, and triggers, all have a fixed mechanical surface feel that is dependent on the materials that are used to manufacture them. In addition, standard gaming peripherals currently only use whole body vibration to provide tactile feedback to the user.

SUMMARY

It is desirable to have the ability to change the feel of the surface features on surfaces of user interface devices, such as the surfaces of user input elements of gaming peripherals, to provide a whole new experience for game players. For example, it is desirable to have the ability to change the surface properties of the device according to the function the user is controlling, or the game situation the user is experiencing, to enhance the immersion feeling in the game. By providing the surfaces of user input elements on gaming peripherals to have, for example, a programmable friction sensation, the user input elements may communicate additional information to the user, such as game state. This may also allow a controller of a gaming system to adapt to the gaming scenario currently engaged in to make the gaming peripheral, such as a gamepad or wand, feel more like the virtual object the user is experiencing.

According to an aspect of the invention, there is provided a user interface device that includes a housing, a user input element supported by the housing, and a haptic output device supported by the housing. The haptic output device is configured to generate a haptic effect at a surface of the user interface device. The surface is part of the housing and/or the user input element. The user interface device includes a processor disposed within the housing. The processor is configured to receive an input command from the user input element, communicate the input command to a host computer, receive an output command from the host computer, and output a haptic signal based on the output command to the haptic output device to generate the haptic effect at the surface.

According to an aspect of the invention, there is provided a system that includes a display configured to display video content, a host computer comprising a first processor configured to output the video content to the display, and a user interface device in communication with the host computer. The user interface device includes a housing, a user input element supported by the housing, and a haptic output device supported by the housing. The haptic output device is configured to generate a haptic effect at a surface of the user interface device. The surface is part of the housing and/or the user input element. The user interface device includes a second processor disposed within the housing. The processor is configured to receive an input command from the user input element, communicate the input command to the host computer, receive an output command from the host computer, and output a haptic signal based on the output command to the haptic output device to generate the haptic effect at the surface.

BRIEF DESCRIPTION OF THE DRAWINGS

The components of the following Figures are illustrated to emphasize the general principles of the present disclosure and are not necessarily drawn to scale. Reference characters designating corresponding components are repeated as necessary throughout the Figures for the sake of consistency and clarity.

DETAILED DESCRIPTION

Figure 1:
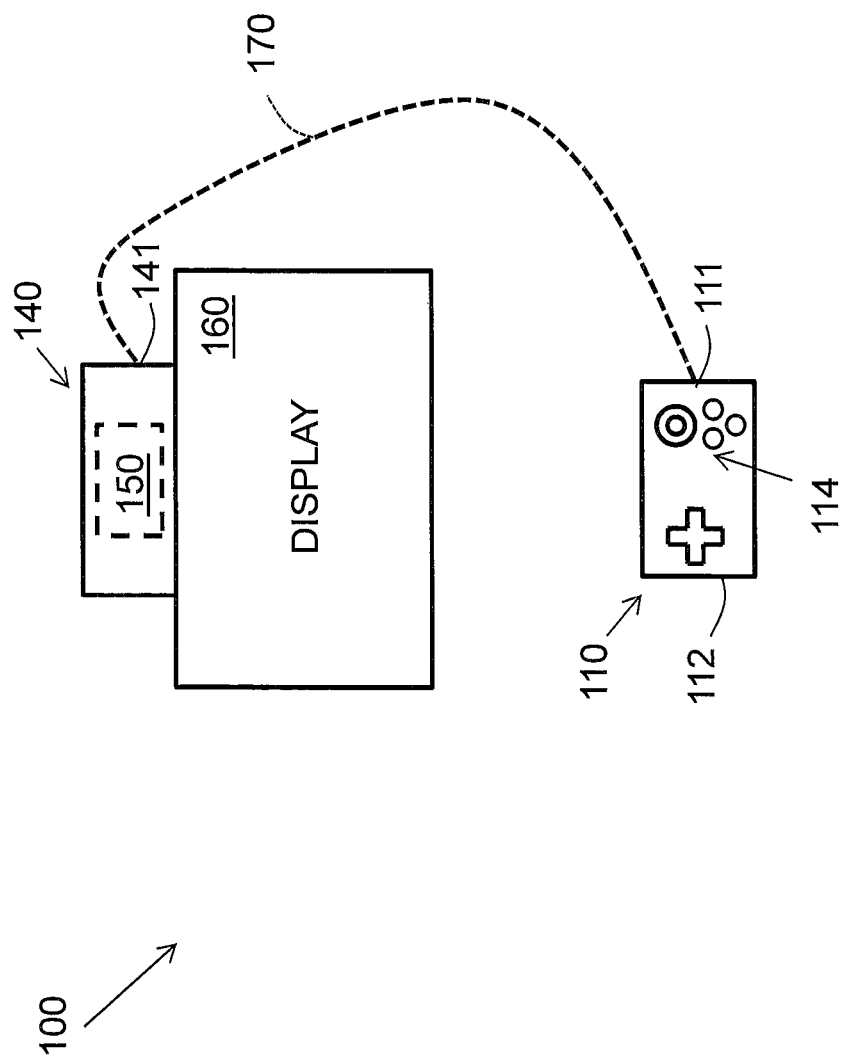
FIG. 1 schematically illustrates a system in accordance with embodiments of the invention.

FIG. 1 schematically illustrates an embodiment of a system 100 in accordance with embodiments of the invention. As illustrated, the system 100 includes a user interface device 110, a host computer 140, and a display 160. In an embodiment, the system 100 is a gaming system, the user input device 110 is a gaming peripheral or controller, and the host computer 140 is a gaming console, and as discussed in further detail below.

Figure 2:
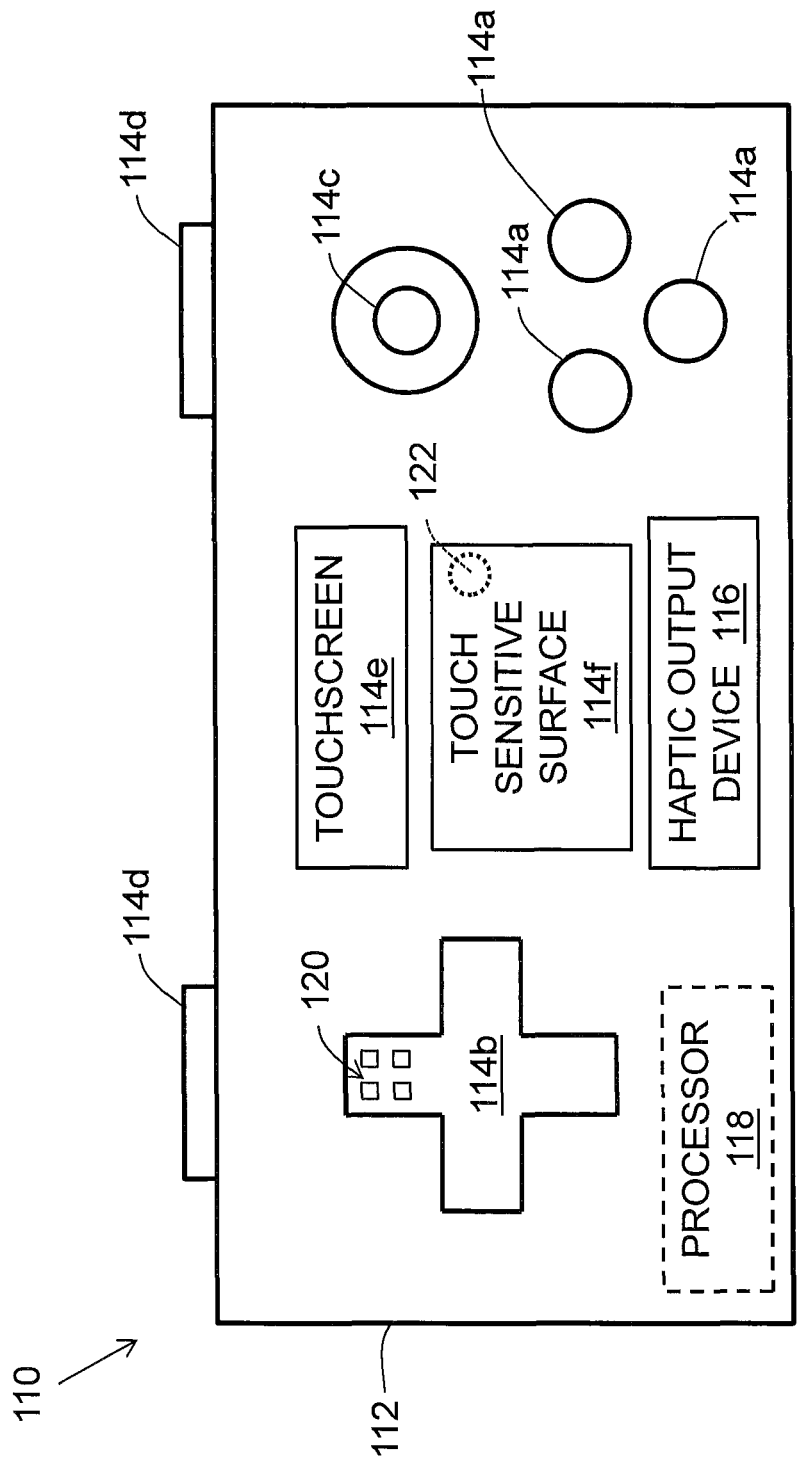
FIG. 2 schematically illustrates a user interface device of the system of FIG. 1 in accordance with embodiments of the invention.

The user interface device 110, which is illustrated in further detail in FIG. 2, includes a housing 112, user input elements 114 supported by the housing 112, a haptic output device 116 (FIG. 2) supported by the housing 112, and a processor 118 (FIG. 2) disposed within the housing 112. In an embodiment, the user interface device 110 may be a computer mouse. In an embodiment, the user interface device 110 may be a gaming peripheral, such as a gamepad, a wand, a remote control, a force sensitive plate, a steering wheel, a computer mouse, or any other device that is configured to allow a user to provide input to the host computer 140 and receive haptic effects from the haptic output device 116, as discussed in further detail below. For example, the user interface 110 may be a wearable device, such as a pair of glasses configured to allow a user to provide input to the host computer 140 and/or receive haptic effects from the haptic output device 116.

The housing 112 may be formed from one or more materials that provide different functionalities to the user interface device 110. For example, a portion of the housing 112 may include a stiff polymeric material that is suitable for supporting the user input elements 114, the haptic output device 116, and the processor 118. In an embodiment, a portion of the housing 112 may include a conductive material so that the haptic output device 116 may provide a particular type of haptic effect to the user, as discussed in further detail below.

The user input elements 114 may include one or more of a button 114a, a d-pad 114b, an analog joystick 114c, a trigger 114d, a touchscreen 114e, and a touch sensitive surface 114f, as illustrated in FIG. 2. Each of the user input elements 114 is configured to allow the user to provide an input command to the host computer 140 via the processor 118, as discussed in further detail below.

The haptic output device 116 is configured to generate a haptic effect or sensation to the user of the user interface device 110. The haptic effects or sensations that are generated by the haptic output device 116 may be created with any method for creating haptics, such as vibration, deformation, kinesthetic sensations, electrostatic or ultrasonic friction, etc. In an embodiment, the haptic output device 116 may include an actuator, for example, an electromagnetic actuator such as an Eccentric Rotating Mass ("ERM") in which an eccentric mass is moved by a motor, a Linear Resonant Actuator ("LRA") in which a mass attached to a spring is driven back and forth, or a "smart material" such as piezoelectric materials, electro-active polymers or shape memory alloys, a macro fiber composite actuator, an electro-static actuator, an electro-tactile actuator, and/or another type of actuator that provides a physical feedback such as a haptic (e.g., vibrotactile) feedback. The haptic output device 116 may include non-mechanical or non-vibratory devices such as those that use electrostatic friction (ESF), ultrasonic surface friction (USF), or those that induce acoustic radiation pressure with an ultrasonic haptic transducer, or those that use a haptic substrate and a flexible or deformable surface, or those that provide projected haptic output such as a puff of air using an air jet, or thermal devices that provide temperature effects, and so on. In an embodiment, multiple haptic output devices may be used in the user interface device 110 to generate different haptic effects.

Returning to FIG. 1, the host computer 140 includes at least one processor 150 configured to execute one or more computer program modules, as described below with respect to FIG. 3. The host computer 140 may be any type of computing device, such as a personal computer or as mentioned above, a gaming console when the system 100 is a gaming system, or a handheld device, such as a touch screen handheld device, which may be a mobile device. As illustrated in FIG. 1, the host computer 140 is in communication with the user interface device 110 though a wired or wireless communication channel 170 established between a communication port 141 of the host computer 140 and a communication port 111 of the user interface device 110.

Figure 3:
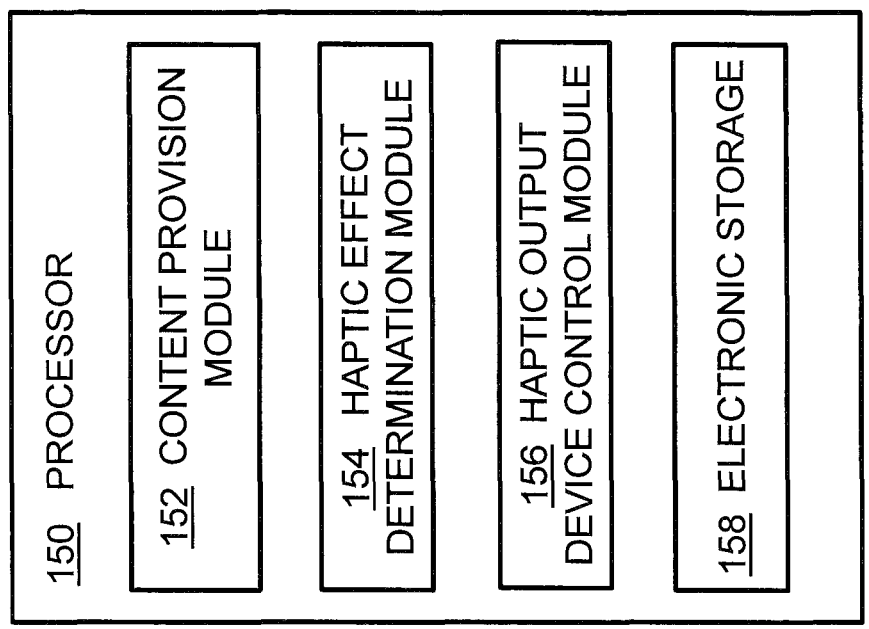
FIG. 3 schematically illustrates a processor of the system of FIG. 1 in accordance with embodiments of the invention.

As illustrated in FIG. 3, the processor 150 is configured to execute one or more computer program modules. The one or more computer program modules may include one or more of a content provision module 152, a haptic effect determination module 154, a haptic output device control module 156, and/or other modules. The processor 150 may be configured to execute the modules 152, 154, and/or 156 by software, hardware, firmware, some combination of software, hardware, and/or firmware, and/or other mechanisms for configuring processing capabilities on processor 150.

It should be appreciated that although modules 152, 154, and 156 are illustrated in FIG. 3 as being co-located within a single processing unit, in embodiments in which the host computer 150 includes multiple processors, one or more of modules 152, 154, and/or 156 may be located remotely from the other modules. For example, as discussed in further detail below, the processor 118 of the user interface device 110 may include one or more of the modules 152, 154, and/or 156. The illustrated embodiment is not intended to be limiting in any way.

The description of the functionality provided by the different modules 152, 154, and/or 156 described below is for illustrative purposes, and is not intended to be limiting, as any of the modules 152, 154, and/or 156 may provide more or less functionality than is described. For example, one or more of the modules 152, 154, and/or 156 may be eliminated, and some or all of its functionality may be provided by other ones of the modules 152, 154, and/or 156. As another example, the processor 150 may be configured to execute one or more additional modules that may perform some or all of the functionality attributed below to one of the modules 152, 154, and/or 156.

The content provision module 152 is configured to control the provision of content to the user of the system 100 via the display 160. If the content includes computer generated images (e.g., in a videogame, virtual world, augmented reality virtual world, simulation, etc.), the content provision module 152 is configured to generate the images and/or views for display to the user through the display 160. If the content includes video and/or still images, the content provision module 152 is configured to access the video and/or still images and to generate views of the video and/or still images for display on the display 160. If the content includes audio content, the content provision module 152 is configured to generate the electronic signals that will drive a speaker, which may be part of the display 160, to output corresponding sounds. The content, or information from which the content is derived, may be obtained by the content provision module 152 from an electronic storage 158, which may be part of the processor 150, as illustrated in FIG. 3, or may be separate from the processor 150.

The haptic effect determination module 154 is configured to determine the haptic effect or sensation to be generated by the haptic output device 116 of the user interface device 110 for the user, based on information received from the content provision module 152 or the user input element 114 or any other input that is configured to determine the user's intent. Determining the haptic effect may include determining one or more parameters that include an amplitude, frequency, duration, etc., of the haptic sensation. The haptic effect is determined by the haptic effect determination module 156 to enhance one or more aspects of the experience provided by the content to the user. For example, the haptic effect may be determined to enhance one or more of the realism of the content, the enjoyability of content, perception of the content by the user, and/or other aspects of the experience provided by the content being conveyed to the user via the display 160.

The haptic output device control module 158 is configured to control the haptic output device 116 to generate the haptic effect determined by haptic effect determination module 156. This includes communicating the haptic output signal to be generated by the processor 150 to the haptic output device 116. The haptic effect to be generated may be communicated over wired communication links, wireless communication links, and/or other communication links between the processor 150 and the haptic output device 116, such as through the wired or wireless communication channel 170 established between a communication port 141 of the host computer 140 and a communication port 111 of the user interface device 110. In an embodiment, at least a portion of the functionality attributed to the haptic output device control module 158 may be disposed in the processor 118 carried by the user interface device 110 and data from the haptic effect determination module 156 located in the processor 150 may be communicated to the haptic output device control module 158 in the processor 118 through the wired or wireless communication channel 170.

The haptic output device 116 is configured to receive the haptic signal from the haptic output device control module 158, and output a haptic effect to the user through the user interface device 110. The haptic sensations the user feels may depend on the information being communicated to the user by the host computer 140. For example, the haptic sensation may be used to convey game information, such as object interaction, character movement, character status, and/or character type. The haptic sensations can also be used to indicate the current mode of interaction, such as moving a character, or holding a specific weapon. The haptic sensations may also be queried in the sense that the user may explore a surface of the housing 112 and/or user input elements 114 to determine or check for specific information.

The surface of the housing 112 and/or the user input elements 114 such as the buttons 114a, d-pad 114b, and joystick 114c of the user interface device 110 may have programmable friction, texture, such as a feel of grooves and bumps, or other haptic sensations. The haptic sensations may be created by electrostatic friction, ultrasonic friction, local surface deformation, electrotactile stimulation, such as electrocutaneous stimulation, thermal effects and/or vibration.

In an embodiment, surface haptic sensations may be in the form of programmable textures or varying friction sensations. For example, the surface of the d-pad 114b may have electrodes 120 embedded in one or more of the four sections of the d-pad 114b. When the user moves his/her finger or thumb over the surface of the d-pad 114b, the electrodes 120 may be charged in a time varying fashion in order to create an electrostatic force on the user's finger to create the sensation of detents, textures or a programmable friction sensation. D-pads are often used to enter directional information into the game. The user typically slides his/her thumb along this type of user input element 114, which is particularly suited to provide electrostatic haptic sensations.

According to embodiments of the invention, surface haptic sensations may be created on at least one of the following user input element 114 surfaces: buttons 114a, d-pad 114b, analog joystick 114c, triggers 114d, touchscreen 114e, and touch sensitive surfaces 114f, and/or on at least one of the surfaces, i.e. front, back, or side surfaces, of the housing 112.

In an embodiment, the friction of the user input elements 114 may be programmably adjusted. For example, buttons 114a that are active in a gaming application may have one friction sensation and those that are not used in the gaming application may have another level of friction sensation, so the user may feel the active button through haptic feedback.

In an embodiment, a user may move his/her finger along the back of the housing 112 in order to query for information, such as boss strength or character status.

In an embodiment, programmable surface detents may be placed on the d-pad 114b when the user's character is interacting with different surfaces in the game. For example, a different sensation may be felt when the user's character is running through mud as compared to when running on hard ground.

In an embodiment, the top of the analog joystick 114c may have a programmable texture to indicate game environment or interaction mode. For example, a different texture may display when a user is driving a different vehicle or is using a different weapon.

In an embodiment, the triggers 114d may have a different texture or friction depending on weapon type, firing rate, etc. In an embodiment, the user may set the feel of the haptic effect based on the user's preference.

In an embodiment, the user interface device 110 may be a wand or wand-like motion controller that has programmable textures or friction on the housing 112 to indicate weapon type or specific ways objects are being interacting with. For example, an ice sword may have a low simulated friction coefficient compared to a regular sword.

In an embodiment, one of the user input elements 114 described above, such as one of the buttons 114a, or another user input element on the user interface device 110 may be used to adjust the level of friction on, for example, the d-pad 114b.

In an embodiment, electronic circuitry may be included in the user interface device 110 to drive the haptic output device 116 based on the output of the haptic output device control module. For example, an amplifier may be used to reach the voltages need for certain types of actuators to generate the desired haptic effect.

According to embodiments of the invention, the haptic output device 116 is coupled directly to, or integrated with, the surface to be augmented with surface haptics, depending on the desired haptic effect.

In embodiments in which at least part of the haptic effect includes electrostatic friction, the outer surface of the housing 112 or the surface of the input element 114 providing the surface of the user interface device 110 to be augmented is made of a conductive material covered with a thin insulator. For example, one of the buttons 114a may be made of metal and covered with a thin layer of plastic. The conductive layer is connected to the driving electrical signal provided by the haptic output device 116. In this embodiment, the user's body must be connected to a shared ground, either through another surface of the device (e.g., back of the housing 112) or by some other method, such as a bracelet worn by the user or a grounded chair on which the user is sitting. In an embodiment, the roles of the ground and surface may be reversed, as is done with reverse electrovibration.

In an embodiment in which at least part of the haptic effect includes ultrasonic friction, the surface to be augmented vibrates at ultrasonic frequencies. Such an effect may be done using actuators, such as piezoelectric actuators. In this embodiment, the surface is typically suspended at vibration nodes so that vibrations are not dampened. For example, a piezoelectric actuator may be attached to a d-pad that is suspended on springs.

In an embodiment in which at least part of the haptic effect includes local surface deformation, deformable actuators, such as macro fiber composite (MFC) actuators may be used at the surface to be actuated to either deform directly or move an intermediate object to deform the surface. For example, a deformable actuator may bend at the surface of a d-pad to create a concave shape. Surface feel may also be adjusted by having small protrusions at the surface.

In an embodiment in which the haptic effect is electrotactile stimulation, electrodes may be placed at the surface that is to produce haptic feedback. For example, the housing 112 may be covered with a film containing an array of electrodes, or select surfaces of the user input element 114, such as the d-pad 114b, may be covered with a film containing an array of electrodes 120, as described above. In an embodiment, the electrodes may alternatively be embedded in the material of the surface.

In an embodiment in which the haptic effect is a thermal effect, a thermal device, such as a Peltier cooler, may be used at the surface to control its thermal properties, either directly or through an intermediary surface with appropriate thermal conductance.

In an embodiment in which the haptic effect is vibration, similar to ultrasonic friction described above, vibrations are applied to the surface through an actuator connected to the surface. The actuator may be an eccentric rotating mass (ERM) actuator, a linear resonant actuator (LRA), a piezo-electric actuator, or any other vibration actuator.

In an embodiment, the user interface device 110 may include a touch sensor 122 at the surface to be augmented that is configured to sense a position of contact with the surface by the user and communicate the position to the processor 118 so that the haptic effect may be modulated. For example, electrostatic friction is typically applied to an entire surface but can be modulated as a finger moves against it to create the illusion of local features. Such a haptic effect requires sensing of the finger position, and communicating the sensor readings to the haptic output device control module 156 or the content provision module 152 in order to adjust the haptic rendering to the surface.

Exemplary implementations of embodiments of the invention in a gaming environment will now be described. In an implementation, the texture of one of the buttons 114a may be repetitively felt by the user while waiting for the right timing for an action to take during a game. For example, a gamer could be waiting for a laser gun to recharge or for a cue from the game for the performance of a timing-critical operation. The texture of the button 114a may be configured to change gradually to indicate progress, abruptly to indicate a sudden change, or very briefly to provide a cue that can easily be missed.

In an implementation, a game may vary the friction at the surface of a control such as the d-pad 114b in order to disturb the player and make the game more difficult. For example, a car that has been damaged may be controlled with a d-pad having unpredictable friction.

Games often involve repetitive gestures such as repeatedly pressing left-right on a d-pad or shaking a gamepad. In an implementation, the texture of the d-pad 114b or a surface of the housing 112 may change to provide feedback about the performance of an action, such as progress being made in the breaking of a door, or some other action requiring a repetitive gesture.

Games often have a tutorial at the beginning in which the controls are gradually explained. In an implementation, surface effects may be used to highlight the buttons 114a and other user input elements 114 that are being shown in the tutorial. For example, a tutorial may explain that a particular button needs to be pressed and add a texture to that button to make it easier to find. This may also be used to help players in "easy" mode, for example, to indicate what button needs to be pressed in certain situations. For example, a haptic effect may be provided to the user input element 114 that is predicted to be the most likely element to be used next.

In an implementation using the thermal device as the haptic output device 116, the surface of the housing may get hot to match events in a game, such as an explosion or shooting a gun.

In an implementation, surface haptics may also be used to indicate the presence of virtual controls such as buttons and sliders, for example on the touch sensitive surface 114f, and simulate physical interactions while the virtual controls are used. For example, a game may use different virtual controls on the backside of the housing 112, depending on the current context, such as different mini-games with distinct input requirements. Touch sensitive surfaces may also be used for gestural input with haptic textures and effects providing confirmation and additional feedback. This may be particularly relevant if additional sensors are used on the surface to enable spatial tactile effects. In an implementation, the touch sensitive surfaces may also be used for free space gestural input. For example, the surface feel of the device may change according to the position, orientation, and/or velocity of the device. In an implementation, surface haptics may be used to create a virtual button that is felt by the user to be raised or depressed. The stiffness of the virtual button may be modified with surface haptics to make the button seem easier or harder to press.

In an implementation, the haptic state of surface of the housing 112 or at least one of the user input elements 114 may communicate ambient information about the current state of the user interface device 110. For example, in embodiments in which the user interface device is battery powered, different textures of at least a portion of the surface may indicate different battery levels in a subtle, non-obtrusive manner.

The illustrated and above-described embodiments are not considered to be limiting in any way, and embodiments of the present invention and may be used to enable haptic feedback in various electronic devices, such as touch screen handheld devices (mobile devices, PDA, and navigation systems), automotive applications, etc.

Although many of the examples described herein relate to gaming devices, it should be understood that the present disclosure also encompasses other types of human-computer interfaces involving touch sensitive structures. In addition, other features and advantages will be apparent to one of ordinary skill in the art upon reading and understanding the general principles of the present disclosure. These other features and advantages are intended to be included in the present disclosure as well.

The embodiments described herein represent a number of possible implementations and examples and are not intended to necessarily limit the present disclosure to any specific embodiments. Instead, various modifications can be made to these embodiments as would be understood by one of ordinary skill in the art. Any such modifications are intended to be included within the spirit and scope of the present disclosure and protected by the following claims.

What is claimed is:

1. A user interface device comprising:
a housing;
a touch sensitive surface supported by the housing;
a haptic output device supported by the housing; and
a processor disposed within the housing, the processor configured to receive a gestural input from the touch sensitive surface, the gestural input usable, by a host computer separate from the user interface device, for controlling an object in a game displayed on a display associated with the host computer;
communicate the gestural input to the host computer via a communication channel;
receive an output command from the host computer via the communication channel, wherein the host computer generates the output command based on the controlling of the object in the game;
generate a signal for a haptic effect based on the output command; and
output the signal to the haptic output device to generate the haptic effect, the haptic effect corresponding to the controlling of the object in the game.

2. The user interface device according to claim 1, further comprising a touch sensor at the touch sensitive surface, the touch sensor configured to sense a position of contact with the touch sensitive surface by a user of the user interface device and communicate the position to the processor.

3. The user interface device according to claim 2, wherein the processor is further configured to modulate the signal to adjust the haptic effect to be generated by the haptic output device.

4. The user interface device according to claim 1, wherein the haptic output device is configured to generate the haptic effect at the touch sensitive surface.

5. The user interface device according to claim 1, further comprising a communication port configured to establish the communication channel between the user interface device and the separate host computer.

6. The user interface device according to claim 5, wherein the user interface device is a gaming peripheral and the host computer is a gaming console.

7. A method for generating a haptic effect to a user of a user interface device, the method comprising:
receiving a gestural input provided to a touch sensitive surface of the user interface device by the user, the gestural input usable, by a host computer separate from the user interface device, for controlling an object in a game displayed on a display associated with;
communicating, by the user interface device, the gestural input to the host computer via a communication channel;
receiving, by the user interface device, an output command from the host computer via the communication channel, wherein the host computer generates the output command based on the controlling of the object in the game;
generating a signal for a haptic effect based on the output command, the haptic effect to be generated by a haptic output device;
outputting the signal to the haptic output device; and
generating the haptic effect with the haptic output device, wherein the haptic effect corresponds to the controlling of the object in the game.

8. The method according to claim 7, further comprising:
sensing a position of contact with the touch sensitive surface of the user interface by the user with a touch sensor.

9. The method according to claim 8, further comprising:
modulating the signal to adjust the haptic effect based on the sensed position of contact.

10. The method according to claim 7, wherein the haptic effect is generated at the touch sensitive surface.

11. The method according to claim 7, wherein the user interface device is a gaming peripheral and the separate host computer is a gaming console.

12. A system comprising:
a display configured to display video content;
a host computer comprising a first processor configured to output the video content to the display; and
a user interface device separate from the host computer and configured to be in communication with the host computer, the user interface device comprising:
a housing;
a touch sensitive surface supported by the housing;
a haptic output device supported by the housing; and
a second processor disposed within the housing, the second processor being separate from the first processor and configured to:
receive a gestural input from the touch sensitive surface; and
communicate the gestural input to the host computer via a communication channel, the gestural input usable, by the host computer, for controlling an object in a game displayed on the display associated with the host computer;
receive an output command from the host computer via the communication channel, wherein the host computer generates the output command based on the controlling of the object in the game; and
output a signal to the haptic output device to generate a haptic effect based on the output command, the haptic effect corresponding to the controlling of the object in the game.

13. The system according to claim 12, wherein the host computer comprises a first communication port and the user interface device comprises a second communication port configured to establish the communication channel with the first communication port.

14. The system according to claim 12, wherein the user interface device is a gaming peripheral and the host computer is a gaming console.

15. The system according to claim 12, wherein the user interface device further comprises a touch sensor at the touch sensitive surface, the touch sensor configured to sense a position of contact with the touch sensitive surface by a user of the system and communicate the position to the processor.

16. The system according to claim 15, wherein the second processor is further configured to modulate the signal to adjust the haptic effect based on the position of contact.

17. The system according to claim 12, wherein the haptic output device is configured to generate the haptic effect at the touch sensitive surface.

18. The system according to claim 12, wherein the first processor is configured to generate the signal for the haptic effect to be generated by the haptic output device.

19. The system according to claim 12, wherein the second processor is configured to generate the signal for the haptic effect to be generated by the haptic output device.

* * * * *

UNITED STATES PATENT AND TRADEMARK OFFICE
CERTIFICATE OF CORRECTION

PATENT NO. : 9,715,278 B2
APPLICATION NO. : 14/719455
DATED : July 25, 2017
INVENTOR(S) : Grant et al.

Page 1 of 1

It is certified that error appears in the above-identified patent and that said Letters Patent is hereby corrected as shown below:

In the Claims

In Claim 7, Column 9, Line 27, please insert -- the host computer -- after the word "with" and before the ";"

In Claim 8, Column 9, Line 45, please insert -- device -- after the word "interface" and before the word "by"

In Claim 15, Column 10, Line 41, please insert -- second -- before the word "processor"

Signed and Sealed this
Twenty-fifth Day of June, 2019

Andrei Iancu
*Director of the United States Patent and Trademark Office*